United States Patent
Cann

[11] Patent Number: 5,862,032
[45] Date of Patent: Jan. 19, 1999

[54] COWLING ASSEMBLY

[75] Inventor: Martin Roy Cann, Somerset, United Kingdom

[73] Assignee: GKN Westland Helicopters Limited, Yeovil, United Kingdom

[21] Appl. No.: 679,401

[22] Filed: Jul. 9, 1996

[30] Foreign Application Priority Data

Jul. 11, 1995 [GB] United Kingdom ............ 9513345

[51] Int. Cl.⁶ ............................................... H05F 3/02
[52] U.S. Cl. ........................ 361/217; 361/218; 244/1 A
[58] Field of Search ............................ 361/216, 217, 361/218, 212; 244/1 A; 307/9.1

[56] References Cited

U.S. PATENT DOCUMENTS

| Re. 25,417 | 7/1963 | Amason | 244/1 A |
|---|---|---|---|
| 3,237,514 | 3/1966 | Cline | 361/117 |
| 3,427,270 | 2/1969 | Knight et al. | |
| 3,528,629 | 9/1970 | Cooper | 244/1 A |
| 3,579,033 | 5/1971 | Phillips | 361/222 |
| 4,298,234 | 11/1981 | Brick et al. | 361/218 |
| 4,698,723 | 10/1987 | Bryan, Jr. | 361/218 |
| 5,570,265 | 10/1996 | Smith | 361/218 |

FOREIGN PATENT DOCUMENTS

| 2 400 245 | 3/1979 | France . |
|---|---|---|
| 2 675 767 | 10/1992 | France . |
| 1092939 | 11/1967 | United Kingdom . |
| 1148519 | 4/1969 | United Kingdom . |
| 2 278 741 | 12/1994 | United Kingdom . |

*Primary Examiner*—Fritz Fleming
*Attorney, Agent, or Firm*—Larson & Taylor

[57] ABSTRACT

A cowling assembly for a vehicle comprises a general external surface having secured to or adjacent thereto, an elongate lightning diverter element which, at least when subjected to a high electric field, is electrically conductive, wherein a portion of the diverter element is arranged to project from the general external surface.

18 Claims, 5 Drawing Sheets

COWLING ASSEMBLY

BACKGROUND TO THE INVENTION

This invention relates to a cowling assembly for a vehicle and more particularly to a forward cowling, such as a nose cap assembly or a radome for an aircraft.

Operational equipment such as radar and the like sensory equipment, is commonly forwardly mounted on an aircraft e.g. in the nose of the aircraft.

The equipment is protected from the environment by a nose cap assembly which on most aircraft is constructed predominantly of a material which is transparent to electro-magnetic radiation at the operational frequencies of the equipment, such material typically comprising a fibre reinforced, honeycomb construction.

Such materials however do not provide protection against lightning which can puncture the nose-cap and attach on to the equipment, thus causing severe damage.

DESCRIPTION OF THE PRIOR ART

It is conventional practice to provide on a general surface of the nose cap a strip of material which is normally metallic, and of sufficient cross-sectional area, to capture a leader channel of the lightning, and conduct it e.g. to the (metallic) air frame, so as to protect the nose cap and the operational equipment behind it.

Metallic conducting strips however can interfere with the proper operation of the equipment. Particularly where the equipment is sensory, such as radar, the presence of metallic strips can obstruct the radar's view.

It is known to utilise a lightning diverter strip consisting of metal particles each of which is coated with an oxide layer which insulates the particles from each other and renders the strip substantially non-conductive under normal conditions. Such a strip is virtually, if not completely, transparent to electromagnetic radiation under normal conditions. When subjected to high electrical field conditions, as can be experienced if the nose cap is struck by lightning, the material becomes conductive by establishing a suitable ionised channel along the surface of the diverter to divert the attachment point of the lightning arc by extending the arc length along the path above its surface.

Hence throughout this specification where such a diverter is described as being conductive, it is meant that an ionised channel has been established to divert the attachment point of the lightning.

It is an object of the present invention to provide a new or improved nose cap assembly which is protected from the effects of lightning.

SUMMARY OF THE INVENTION

According to a first aspect of the invention, we provide a cowling assembly for a vehicle comprising a general external surface having secured to or adjacent thereto, an elongate lightning diverter element which, at least when subjected to a high electric field, is electrically conductive, wherein a portion of the diverter element is arranged to project from the general external surface.

It has been found that such a cowling assembly provides for more effectively protection of equipment in vehicles, from the effects of lightning.

This is because it has been found that the functioning of a lightning diverter can seriously be impaired in certain orientations and it is to overcome this loss of function that the invention was developed. It is unlikely that simple metallic conductors would exhibit directional sensitivity.

Preferably, the portion of the elongate lightning diverter element which is arranged to project from the general external surface of the cowling is a free end portion. The projecting portion may extend from the general surface at an angle of between 60° and 90° to the immediately adjacent general surface.

In one embodiment, there may be provided on the generally external surface a protruding part comprising insulating material, which carries the projecting portion of the elongate lightning diverter element on a surface thereof. For example, the protruding part may be secured to the general surface by adhesive, fasteners or otherwise.

The protruding part may comprise a conical, pyramidal, rectangular, half-cylindrical or other formation. The projection portion may extend generally rectilinearly over the surface of the protruding part.

The protruding part of the elongate lightning diverter element may alternatively be self supporting from the general external surface of the cowling assembly, or may be supported by a support member so as to project from the general external surface.

Preferably the elongate lightning diverter element extends substantially continuously from the free end thereof over the general external surface of the cowling. However, if desired, there may be provided one or more interruptions along its length so that the elongate lightning diverter element comprises two or more separated portions.

Preferably though the or each interruption extends for less than 10 mm or so between adjacent portions.

It has been found that small gaps do not significantly diminish the effectiveness of the diverter element to provide protection from lightning.

The elongate lightning diverter element may be made of metal, or another high resistant conducting material, but preferably is made of a material which is substantially non-conducting under normal conditions, but is rendered conductive in the presence of an electric field of sufficient intensity.

The element may for example comprise a layer of metallic particles each of which is coated with an oxide layer, such that the particles are insulated from one another under normal conditions, the insulating effect of the oxide layer breaking down in the presence of a sufficiently intense electric field to permit electrical currents to flow along the diverter element.

It will be appreciated that as the lightning leader propagates, it is surrounded by an electric field orientated parallel to the direction of leader propagation.

It is believed that by providing the projecting part of the elongate lightning diverter element which is more closely in alignment with the electric field of the leader than the remainder of the diverter element, when the ambient electric field in the vicinity of the diverter element is of sufficient strength, the otherwise non-conducting material is rendered conducting, so that the lightning arc when it flows along the channel produced by the lightning leader, is readily captured by the diverter element and flows along the diverter element to ground.

In a conventional arrangement where the elongate lightning diverter element is made of a normally non-conducting material which is rendered conducting in the presence of a high electric field, where the diverter element has no component in the direction of the electric field, it does not always become conducting in sufficient time before the lightning arc strikes, with the result that the lightning arc can damage the cowling assembly, and underlying equipment where provided.

In a practical arrangement, preferably a plurality of elongate diverter elements are provided, each of which may have a respective portion arranged to project from the general external surface of the assembly.

The or at least one of the elongate diverter elements may be adapted to be electrically connected to a frame of the vehicle on which the assembly is to be mounted.

According to a second aspect of the invention we provide a vehicle having a cowling assembly in accordance with the first aspect of the invention.

BRIEF DESCRIPTION OF THE DRAWINGS

The invention will now be described with reference to the accompanying drawings in which.

DETAILED DESCRIPTION OF PREFERRED EMBODIMENTS

Figure 1:
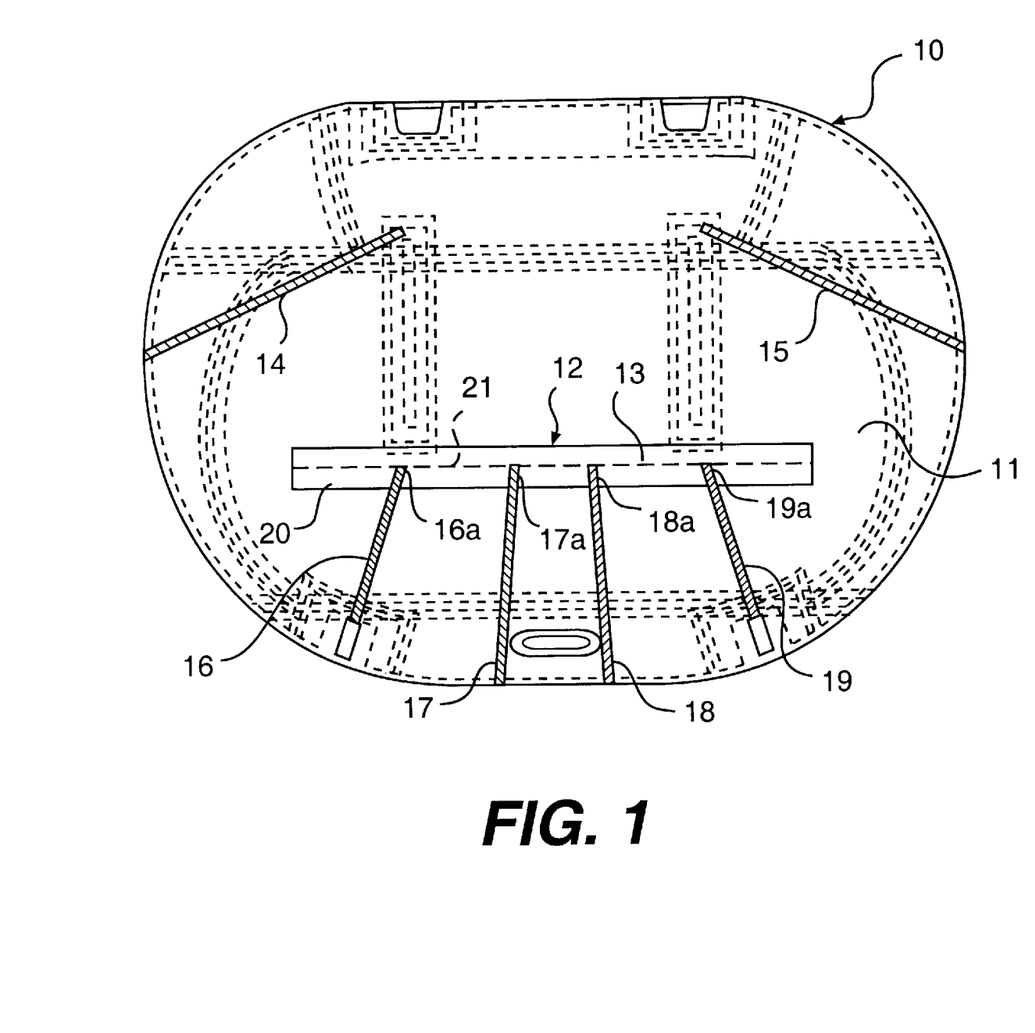
FIG. 1 is a front illustrative view of a first embodiment of a cowling assembly in accordance with the invention.
Figure 1A:
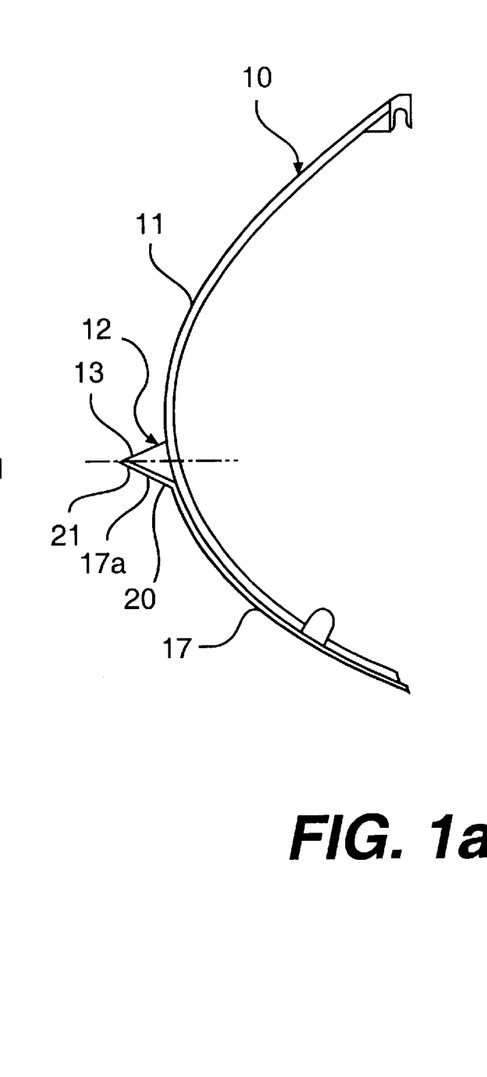
FIG. 1a is a side-sectional view of the cowling assembly of FIG. 1.

Referring to FIGS. 1 and 1a there is shown a cowling assembly 10 in accordance with the invention, comprising in this example a cowling assembly for an aircraft. The assembly 10 is adapted to be mounted at a forward end of the aircraft, and is adapted to provide protection against the environment for radar or like sensory equipment forwardly mounted on the aircraft. Such a cowling assembly is commonly known as radome and is typically made of a fibre reinforced honeycomb construction.

The cowling assembly 10 comprises an external general bulbous surface 11. In this embodiment, a protruding part 12 known as a strake, is provided for aerodynamic purposes.

The strake 12 is generally of triangular form in cross section having an upper surface 13 and a lower surface 20, the surfaces 13 and 20 meeting at an apex 21. The strake 12 extends over a substantial part of the width of the assembly 10.

Attached to the general external surface 11 of the assembly 10, there are provided a plurality of elongate lightning diverter elements, in the form of strips, two upper strips being indicated at 14 and 15, and four lower strips being indicated at 16 to 19.

The two upper strips 14 and 15 are laid across the external surface 11 and lie generally flat over the surface 11. These may be electrically bonded to the metallic airframe of the aircraft, but preferably at least extend towards the metallic airframe. It has been found that any (small) interruption along the length of the diverter elements and/or between any diverter element and a grounded part of the metallic airframe does not significantly prevent the diverter elements performing efficiently.

The four lower strips 16 to 19 each extend throughout substantially their entire length, along the external surface 11, but each has a respective portion 16a to 19a which extends along a lower surface 20 of the strake 11 and thus projects outwardly of the general surface 11 of the nose cap assembly 10.

Each of the lightning diverter strips 14 to 19 comprises a layer of metal particles, each of which is coated with an oxide which effectively insulates the metal particles from one another under normal conditions. The diverter strips 14 to 19 being made in this way, are virtually, if not completely transparent to electromagnetic radiation under normal conditions.

In high electric field conditions however, the insulating property of the oxide coating breaks down and hence any of the diverter strips 14 to 19 which are subjected to such high electric field conditions, becomes conducting, and is able to divert lightning to the metallic airframe to which it is electrically bonded.

An arrangement as shown in FIGS. 1 and 1a was tested. The four lower diverter strips 16 to 19 were found more efficiently to capture lightning from a wide variety of angles of approach. The upper two diverters 14 and 15, which do not have portions which project from the general external surface 11 of the cowling assembly 10, were found not to be as efficient as the lower strips 16 to 19 in protecting the cowling assembly 10 and hence equipment mounted behind it, from the effects of lightning. The upper strips 14 and 15 were found to be particularly ineffective in providing protection against lightning when the lightning approach was generally perpendicular to those strips 14 and 15.

Figure 2:
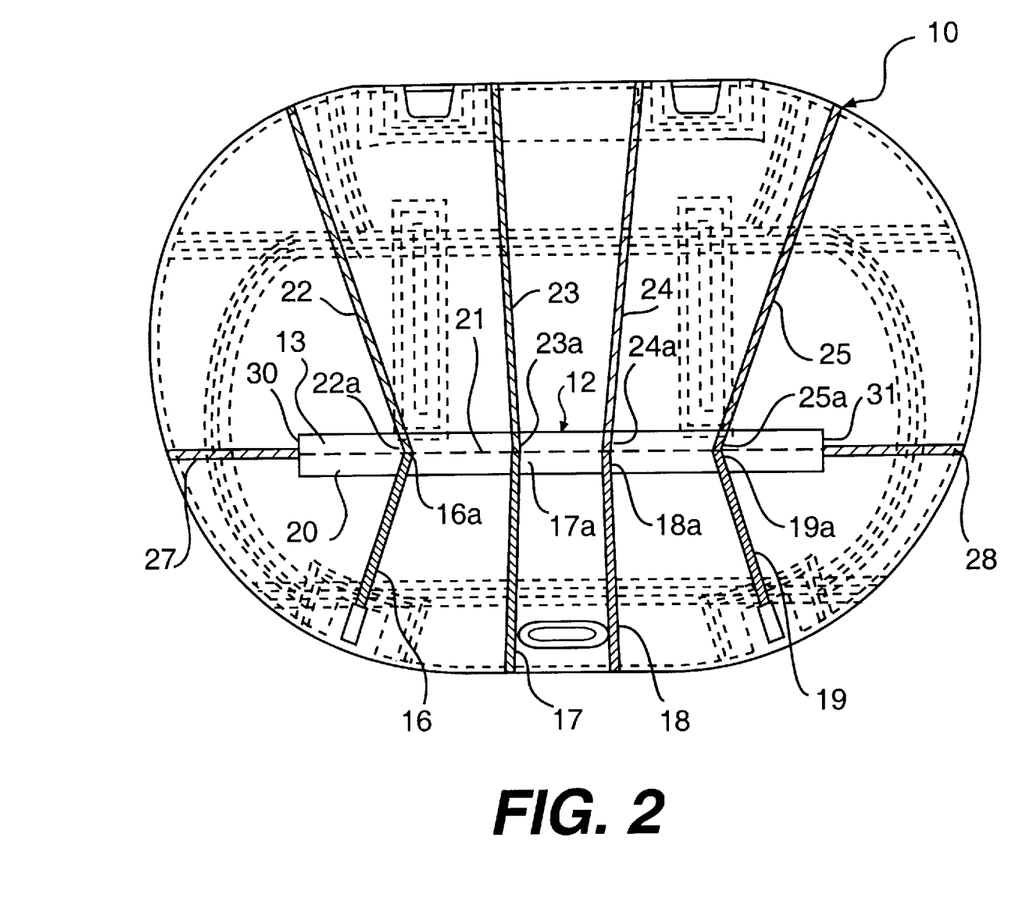
FIG. 2 is a view similar to FIG. 1 but of an alternative embodiment of the invention.
Figure 2A:
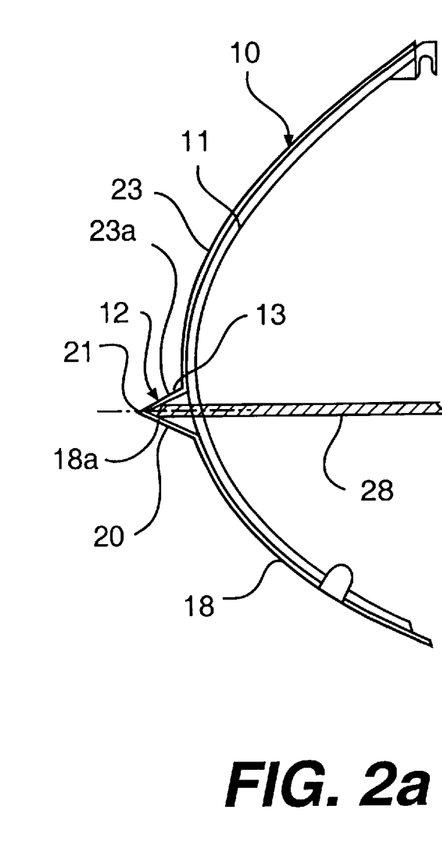
FIG. 2a is a side-sectional view through the cowling assembly of FIG. 2.

Referring now to FIGS. 2 and 2a, a similar cowling assembly 10 is shown which has an external generally bulbous surface 11 but the arrangement of lightning diverter strips on the surface 11 is different from the arrangement of FIGS. 1 and 1a in the following respects.

Like in the FIGS. 1 and 1a arrangement, four lower diverter strips 16 to 19 are provided each of which has a respective portion 16a to 19a being an end portion adjacent a free end of the respective strip 16 to 19, which extends along a lower surface 20 of a strake 12 which provides a protruding part. The lower strips 16 to 19 thus each terminate adjacent the apex 21 of the strake.

The two upper lightning diverter strips 14 and 15 of FIGS. 1 and 1a are however replaced by four upper strips 22 to 25 each of which has a respective portion 22a–25a which extends along the upper surface 13 of the strake 12 and terminates adjacent the apex 21 of the strake 12.

In this arrangement, there are also provided a pair of side lightning diverter elements 27 and 28 each of which extend towards and up a side wall 30, 31 respectively of the strake 12.

A puncture of the external surface 11 of the cowling assembly 10 could not be achieved by a lightning strike in tests on the FIG. 2 and FIG. 2a arrangement.

Referring now to FIGS. 3a through 3j there are shown various alternative configurations of protruding element 12a–12i which may be used in place of the strake 12 as shown in the embodiments so far described.

Figure 3A:
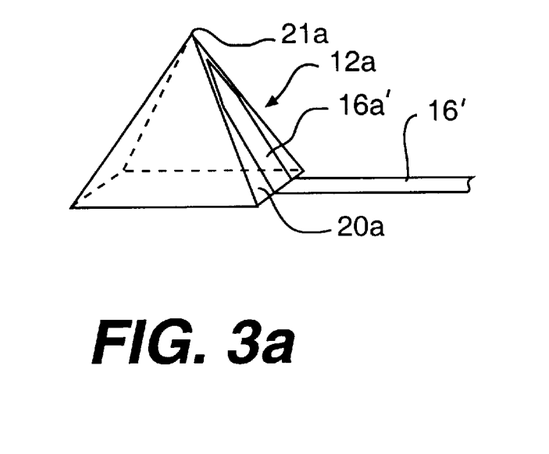
FIGS. 3a through 3j are illustrations of various alternative forms of protruding parts for use in an assembly in accordance with the invention showing part of a lightning diverter element.
Figure 3B:
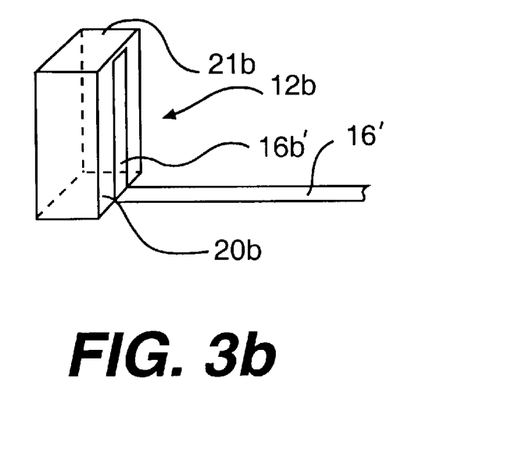

In FIG. 3a the protruding part 12a is in the shape of a pyramid, and a projecting portion indicated at 16a' of a lightning diverter element 16', is shown to extend generally rectilinearly up one face 20a of the protruding part 12a and terminates adjacent an apex 21a thereof. Thus the projecting part 16a' extends at an angle of about 60° to the immediately surrounding general surface 11 from which it projects. In FIG. 3b, a protruding part 12b is shown which comprises a block of insulating material which is a right parallelepiped in configuration, with a projecting portion 16b of the lightning diverter element 16' extending generally perpendicularly to the immediately surrounding general surface from which the protruding part projects, up a vertical face 20b of the block.

Figure 3C:
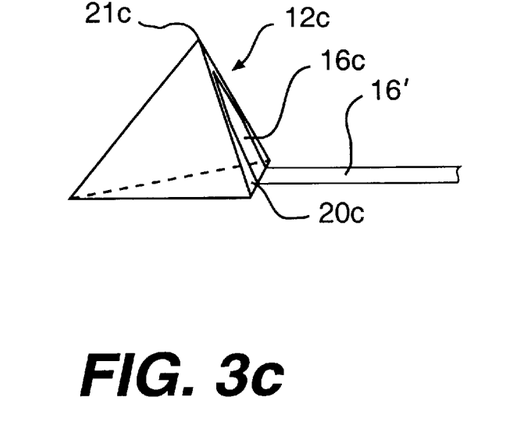

FIG. 3c shows an arrangement similar to that shown in FIG. 3a, although the base is triangular rather than rectangular and the face 20c of the pyramid up which the projecting portion 16c extends is at a steeper angle i.e. about 70° to the immediately surrounding general surface with the result that the projecting portion 16c projects relative to the surface at an angle more close to the perpendicular, than the corresponding projecting portion 16a' of the FIG. 3a arrangement.

Figure 3D:
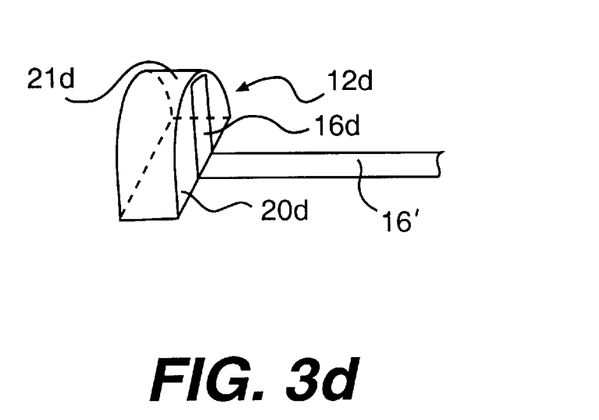

FIG. 3d shows a protruding part 12d which is of semi-cylindrical configuration with a projecting portion 16d of the lightning diverter element 16' extending generally perpendicular to the immediately surrounding surface, generally rectilinearly upwardly along a radial face 20d of the semi-cylindrical part 12d.

Figure 3E:
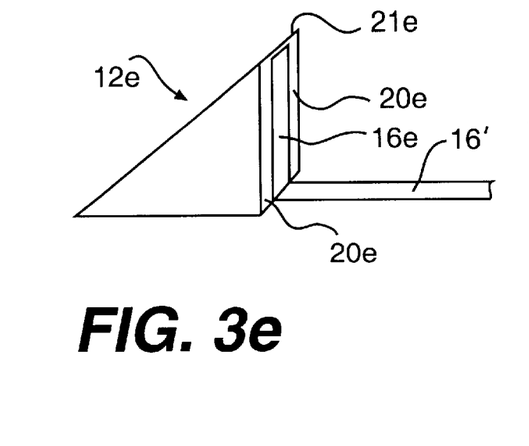

FIG. 3e shows a protruding part 12e which is generally a wedge-shape, with again, the projecting portion 16e of the lightning diverter element 16' extending generally perpendicularly to the immediately surrounding surface of the cowling assembly, generally rectilinearly along a vertical face 20e of the part 12e.

Figure 3F:
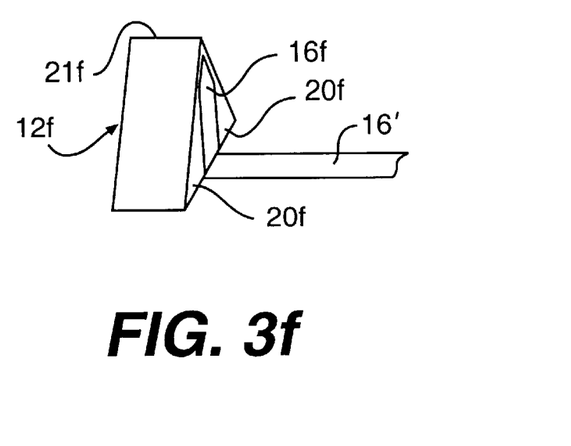

FIG. 3f shows an arrangement similar to FIG. 3e but the projecting portion 16d extends generally vertically upwardly along an alternative vertical face 20f of the wedge shaped protruding part 12f.

Figure 3G:
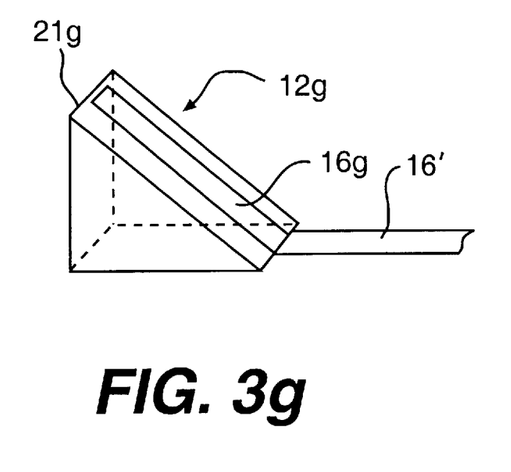
Figure 3H:
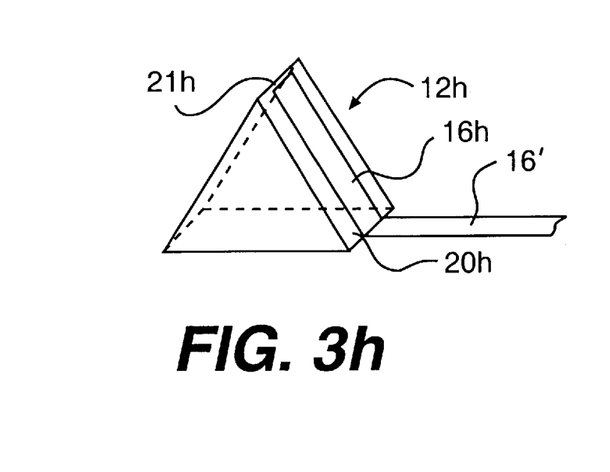

The protruding part 20g shown in FIG. 3g is also of a wedge configuration, but the projecting portion 16g of the lightning diverter element 16' extends generally rectilinearly upwardly along a sloped planar face 20g which extends at an angle of about 40° to the immediately surrounding surface of the cowling assembly from which the protruding part 12g projects. FIG. 3h shows a protruding part 12h of triangular prism form, with a projecting portion 16h extending generally rectilinearly along a sloped face 20h towards an apex 21h of the protruding part 16, at an angle of about 60° to the surface immediately surrounding the protruding part 20h.

Figure 3I:
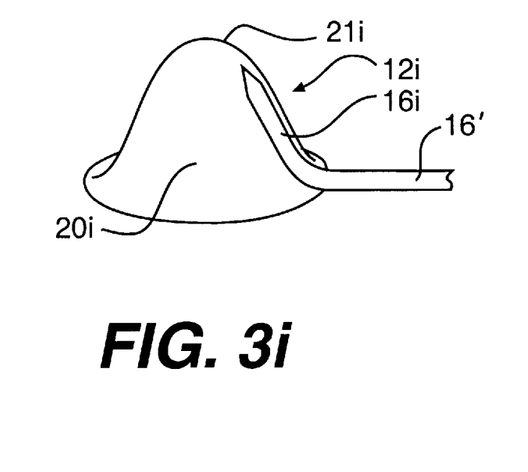

FIG. 3i shows a generally conical form of protruding part 12i although the apex 21i of the cone is rounded. A projecting portion 16i of a lightning diverter element 16' extends upwardly along a rounded surface 20i of the conical protruding part 12i towards the rounded apex 21i at an angle of about 60° relative to the surface surrounding the protruding part 12i.

Hence in each of the arrangements described, there is provided a protruding part 12, and 12a to 12i which is attached to or integral with the general surface of the remainder of the cowling assembly surface 11 and is made of an insulating material such as glass reinforced or kevlar reinforced epoxy resin, and in each case, the projecting portion 16a to 16i of the lightning diverter element 16, 16' extends at an angle between about 40° and 90° to the surface 11 of the cowling assembly 10 immediately surrounding the respective protruding parts.

Figure 3J:
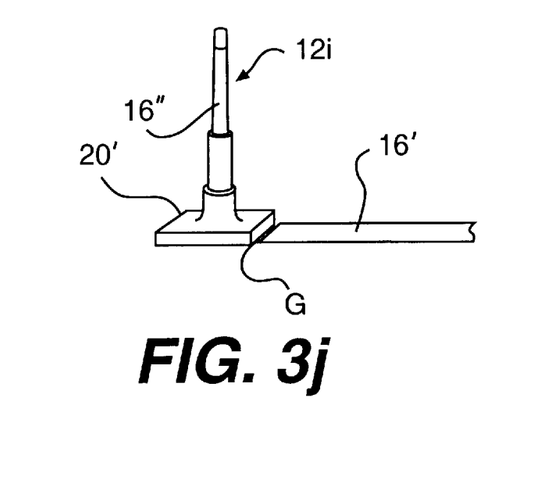

In FIG. 3j there is shown a lightning diverter element 16' which terminates in a projecting portion 16" comprising a rod-like member which is supported in a supporting structure 20'. In this embodiment the rod-like member is made of a carbon based material coated with oxide coated metallic particles.

This performs a dual function of a static discharge unit and incorporating a lightening diverter facility. The supporting structure 20' is adhered or otherwise affixed to the surface 11 of the cowling assembly 10.

It can be seen that there is a small interruption or gap indicated at G between the projecting portion 16" and the remainder of the lightning diverter strip 16'. Provided that such gap G is not greater than about 10 mm, it has been found that the gap G does not prevent lightning being diverted along the diverting element 16. Each of the other embodiments described may include one or more such interruptions along the length of the diverter element and/or between the diverter element and a grounded part of the metallic airframe. Providing lightning diverter elements in sections with such gaps therebetween enables part only of the diverter element to be easily replaced in the event of damage.

Many modifications are possible without departing from the scope of the invention and the arrangements of protruding part, and particular geometrical arrangements of lightning diverter elements on the surface of the cowling assembly 10, shown in the drawings are given by way of example only.

Figure 4:
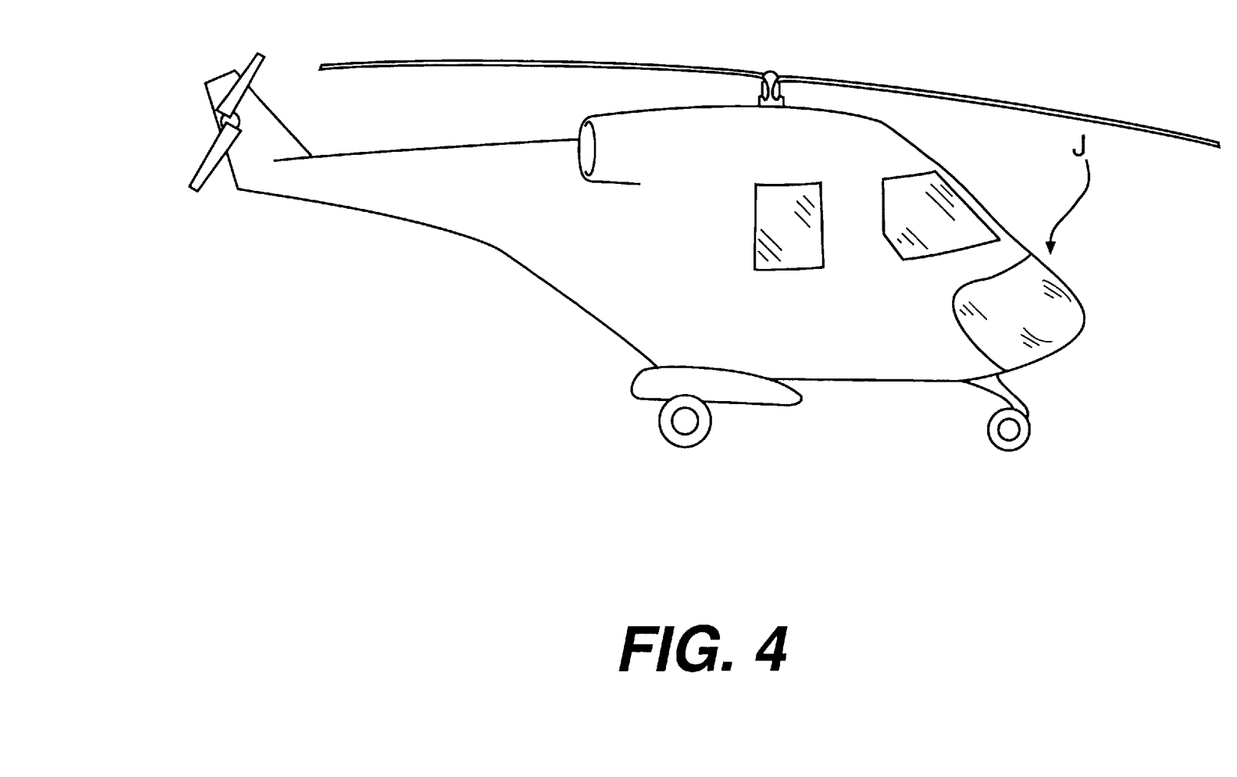
FIG. 4 shows a helicopter having a cowling assembly in accordance with the invention.

Whereas the invention has been described in relation to the cowling assembly 10 for an aircraft such as a helicopter an example of which is shown at J in FIG. 4, the invention may be applied to a cowling assembly for any other vehicle which is provided to protect sensitive equipment of the vehicle from lightning.

I claim:

1. A cowling assembly for a vehicle, comprising:
   an external cowling surface; and
   an elongate lightning diverter element having one end secured to said external cowling surface and a projecting portion which projects outwardly from said external cowling surface, said diverter element being substantially non-conductive under normal conditions and electrically conductive in the presence of an electric field of sufficient intensity.

2. An assembly according to claim 1 wherein said projecting portion of said diverter element extends from the external cowling surface at an angle of between 60° and 90° to the immediately adjacent external cowling surface.

3. An assembly according to claim 1 further comprising a protruding part comprising insulating material, which carries the projecting portion of the elongate lightning diverter element on a surface thereof.

4. An assembly according to claim 3 wherein the protruding part is secured to the external cowling surface by one of adhesive and fasteners.

5. An assembly according to claim 3 wherein the protruding part comprises one of a conical, pyramidal, rectangular or half-cylindrical formation.

6. An assembly according to claim 3 wherein the projecting portion of said diverter element extends generally rectilinearly over the surface of the protruding part.

7. An assembly according to claim 1 wherein the projecting portion of the elongate lightning diverter element is either self supporting or supported by a support member as it projects from the external cowling surface.

8. An assembly according to claim 1 wherein the elongate diverter element is adapted to be electrically connected to a frame of the vehicle on which the assembly is to be mounted.

9. An assembly according to claim 1 wherein the elongate lightning diverter element extends substantially continuously from the projecting portion thereof over the external cowling surface.

10. An assembly according to claim 1 wherein there are one or more interruptions along the elongate diverter element so that the elongate diverter element comprises two or more separated portions.

11. An assembly according to claim 10 wherein each of said one or more interruptions extends for less than 10 mm between adjacent portions of said elongate diverter element.

12. An assembly according to claim 1 wherein the elongate lightning diverter element comprises a highly resistant electrically conducting material.

13. An assembly according to claim 1 wherein the diverter element comprises a layer of metallic particles each of which is coated with an oxide layer, such that the particles are insulated from one another under normal conditions, the insulating effect of the oxide layer breaking down in the presence of a sufficiently intense electric field to permit electrical current to flow along the diverter element.

14. An assembly according to claim 1 further comprising a plurality of elongate diverter elements, each of which has a respective projecting portion projecting outwardly from the external cowling surface.

15. A vehicle having a cowling assembly, said cowling assembly comprising:
an external cowling surface; and
an elogante lightning diverter element having one end secured to said external cowling surface and a projecting portion which projects outwardly from said external cowling surface, said diverter element being substantially non-conductive under normal conditions and electrically conductive in the presence of an electric field of sufficient intensity.

16. A cowling assembly for a vehicle, said cowling assembly comprising:
an external cowling surface;
a protruding part connected to said external cowling surface;
an elongate lightning diverter element extending along or adjacent to said external cowling surface and along the surface of said protruding part so that a portion of said lightning diverter element projects outwardly from said external cowling surface, said lightning diverter element being electrically conductive at least when subjected to a high electric field.

17. An assembly according to claim 16, wherein said lightning diverter element is made of a material which is substantially non-conducting under normal conditions and is electrically conductive in the presence of a high intensity electric field caused by lightning.

18. An assembly according to claim 16, wherein said protruding part comprises insulating material.

* * * * *

UNITED STATES PATENT AND TRADEMARK OFFICE
CERTIFICATE OF CORRECTION

PATENT NO.   : 5,862,032
DATED        : January 19, 1999
INVENTOR(S)  : CANN

It is certified that error appears in the above-indentified patent and that said Letters Patent is hereby corrected as shown below:

On the title page, item:

[56] References Cited

U.S. Patent Documents 3,428,270  2/1969  Knight et al.

Signed and Sealed this

Twenty-ninth Day of June, 1999

*Attest:*

Q. TODD DICKINSON

*Attesting Officer*      Acting Commissioner of Patents and Trademarks